Figure 4:
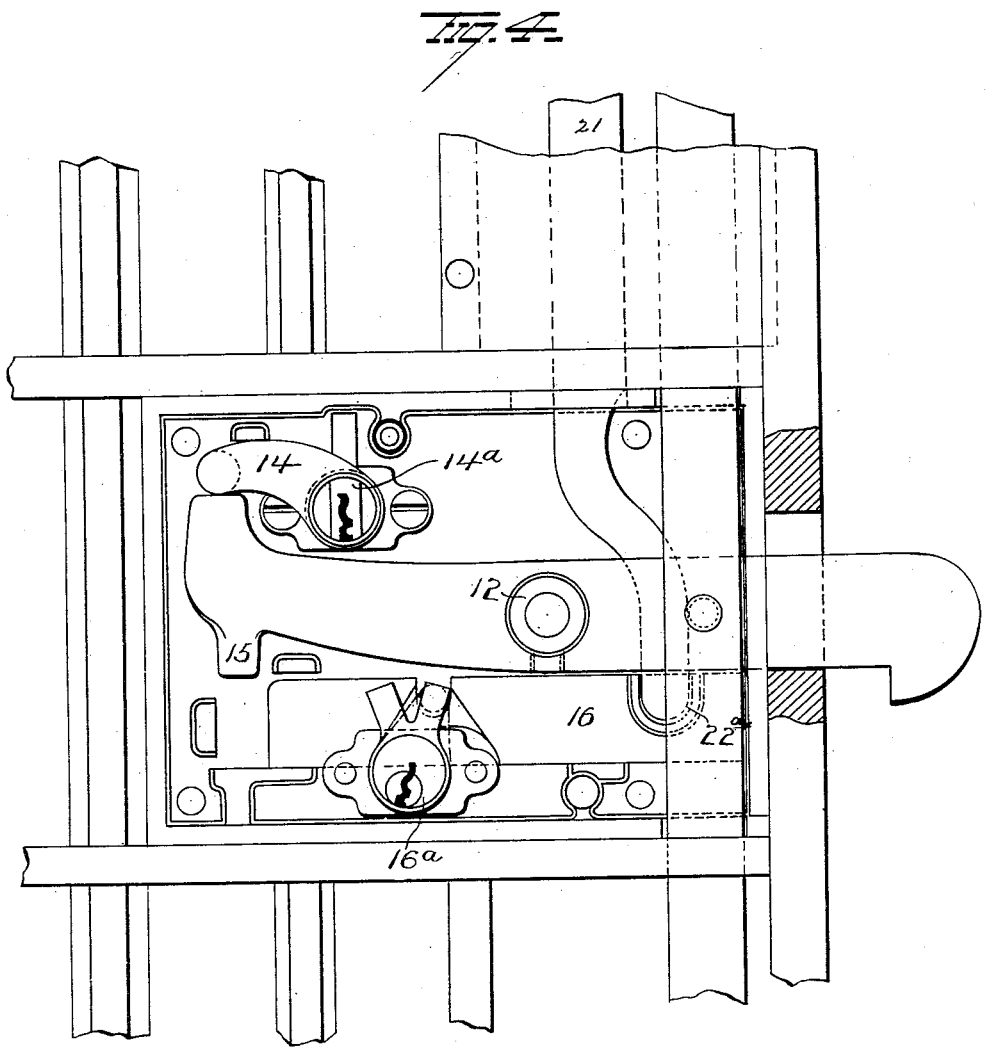

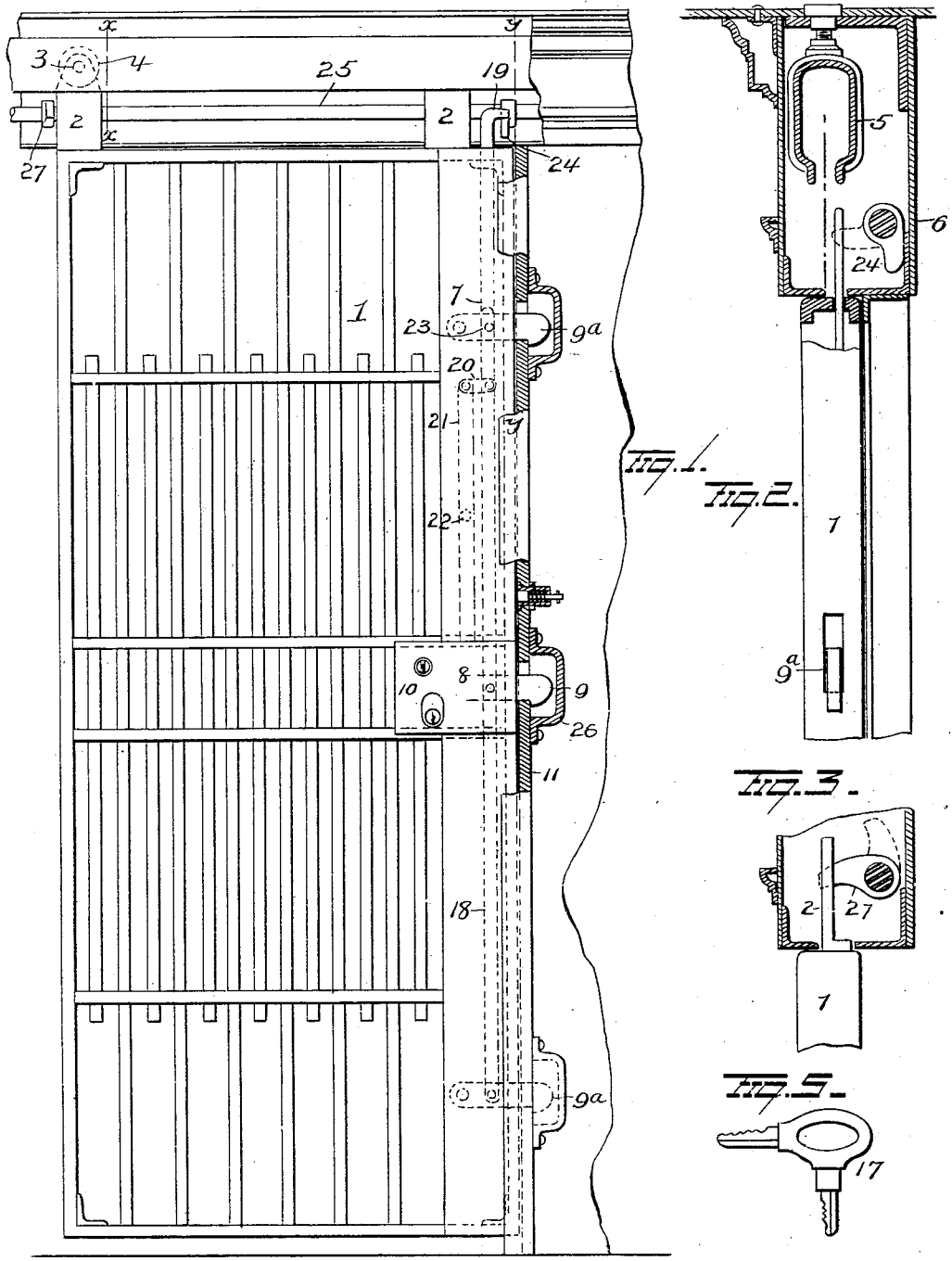

No. 733,203. PATENTED JULY 7, 1903.
A. J. HORGAN.
GANG LOCKING MECHANISM FOR CELL DOORS.
APPLICATION FILED MAY 14, 1903.
NO MODEL. 3 SHEETS—SHEET 2.

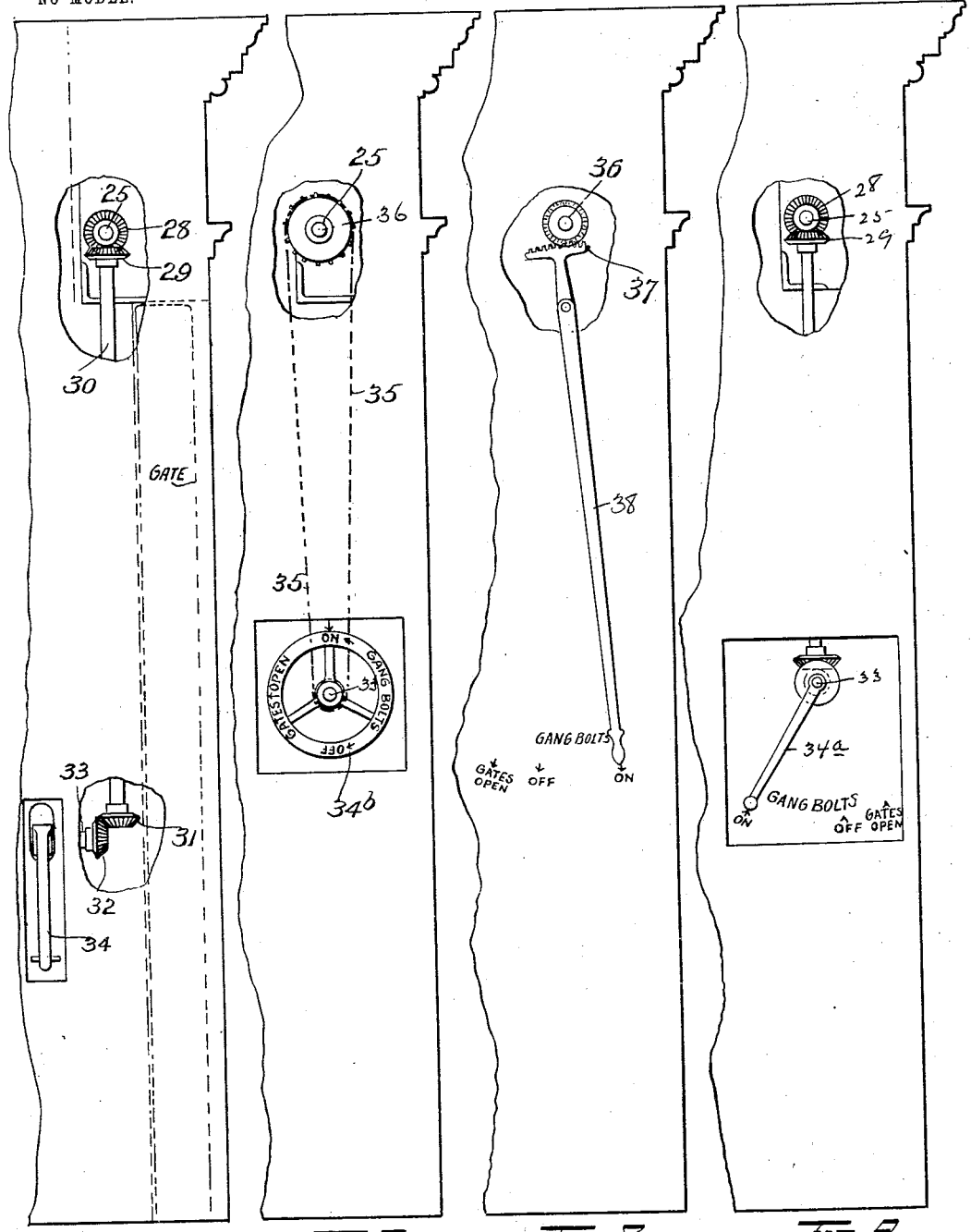

No. 733,203. Patented July 7, 1903.

UNITED STATES PATENT OFFICE.

ARTHUR J. HORGAN, OF NEW YORK, N. Y., ASSIGNOR TO THE YALE & TOWNE MANUFACTURING COMPANY, OF STAMFORD, CONNECTICUT.

GANG LOCKING MECHANISM FOR CELL-DOORS.

SPECIFICATION forming part of Letters Patent No. 733,203, dated July 7, 1903.

Application filed May 14, 1903. Serial No. 157,116. (No model.)

*To all whom it may concern:*

Be it known that I, ARTHUR J. HORGAN, of New York, in the county of New York and State of New York, have invented certain new and useful Improvements in Gang Locking Mechanism for Cell-Doors; and I do hereby declare the following to be a full, clear, and exact description of the invention, such as will enable others skilled in the art to which it appertains to make and use the same.

My invention relates to an improvement in gang locking mechanism for cell-doors, the object being to provide means for simultaneously locking or unlocking a gang of cell-doors, each door being provided with an independent lock whereby it may be locked independently of the gang locking and unlocking mechanism.

With these ends in view my invention consists in the parts and combinations of parts, as will be more fully described, and pointed out in the claims.

In the accompanying drawings, Figure 1 is a view in elevation, partly in section, of a cell-door, showing the gang locking mechanism applied thereto. Fig. 2 is a view in section on the line $y\ y$ of Fig. 1. Fig. 3 is a view on the line $x\ x$ of Fig. 1. Fig. 4 is a view of one form of lock mechanism. Fig. 5 is a view of the key for actuating the lock; and Figs. 6, 7, 8, and 9 are views in elevation, partly in section, of several forms of gearing for actuating the gang locking and unlocking shaft.

1 represents a door of any desired construction provided at its upper end and near its front and rear edges with the hangers 2, which latter are mounted on the axles 3 of the door-carrying rollers 4. These rollers 4 are mounten on or in a suitable trackway; but for the purposes of illustration I have shown them mounted in a trackway 5, formed in the shape of a tube with its two sides flattened; the lower face of the tube being slotted for the passage of the hangers 2, which, as before stated, are mounted on the axles of the rollers 4, the latter resting and traveling on the inner faces of the hanger 5 on opposite sides of the slot. This trackway 5 is located within the upper frame 6 of the cell structure, so that it is concealed and not in a position where it can be tampered with from the cells, and the lower wall of the frame 6 is slotted for the passage of the hangers 2 and also for the gang unlocking-lever 7, carried by the door.

The door 1 is provided with a lock 8 of any approved construction designed to be manipulated to release the latches or bolts 9 and 9ᵃ independently of the gang mechanism, to be hereinafter described, or to deadlock said latches or bolts, so that they will be disconnected from and unaffected by said gang mechanism.

The bolt mechanism comprises a latch or bolt 9, pivoted to the door-frame or armor-plates 10 of the door and adapted to be manipulated by the mechanism of the lock, whereby it can be raised to release it from its keeper in the jamb 11 or deadlock it, so that it will remain unaffected by the gang mechanism. The lock mechanism for actuating and deadlocking the latch 9 may, as before stated, be of any approved form; but I prefer the lock shown and described in the W. H. Taylor patent, No. 645,840, and have illustrated the latter in Fig. 4 of the drawings. In this lock is shown the bolt 9, pivoted at 12 and constructed at its outer end to engage a keeper in the door-jamb, at its rear or inner end with an upwardly-projecting shoulder adapted to be engaged by the unlocking-lever 14 and a heel 15, adapted to engage the deadlocking-slide 16. This slide 16 is located within the lock-casing under the bolt 9 and is adapted to be moved longitudinally, so as to engage and disengage the heel 15 of the bolt 9. When disengaged or removed to a plane in advance of the heel 15, the bolt may then be rocked by the lever 14. When engaged or in the plane of movement of said heel, the bolt 9 is then deadlocked against the gang mechanism. The slide is moved longitudinally by one of the double keys 17, (shown in Fig. 5,) while the lever 14 is depressed to actuate the bolt 9 by the other key. One key of the pair actuates the lock 16ᵃ, which controls the movement of the slide 16, while the other key actuates the lock 14ᵃ, which controls the lever 14, as fully explained in the Taylor patent before referred to.

The mechanism thus far described relates to the mechanism for hanging the door and for locking and releasing each door independently of the others. In addition to this I have provided means for locking and unlocking a series or gang of doors simultaneously. This mechanism comprises latch-operating levers 18 and 7, running lengthwise the door adjacent to the jamb 11, the lever 18 being pivoted to the bolt 9, to an auxiliary bolt 9ª below bolt 9, and to an auxiliary bolt 9ª above bolt 9 and terminating adjacent to the upper bolt 9ª. The bar or lever 7 is pivoted to the upper bolt 9ª, and its upper end projects above the door and into the frame 6 and terminates in a hook 19, while the lower end of said lever projects below bolt 9ª and is connected by link 20 with the deadlocking-lever 21. This lever 21 is pivoted at 22 to the armor-plate 10 and passes downwardly and terminates within a recess 22ª in the upper face of slide 16. Hence when the slide 16 is moved longitudinally the lever 21 turns on its pivot 22 and rocks the gang unlocking-lever 7 on its fulcrum 23. The noses or hooks 19 of the gang unlocking-levers of the several doors of the series rest in position to engage and be engaged by the gang unlocking-cams 24, carried by the gang-shaft 25. This gang-shaft is also concealed within the casing 6 and runs throughout the series or gangs of cells to be operated thereby and is provided with a gang unlocking-cam 24 for each gang unlocking-lever 7.

It is evident from the above construction that when the shaft 25 is turned or partly rotated in one direction the levers of the doors of the series that are not deadlocked are elevated, which lifts the bolts 9 and 9ª. It will be seen, however, that when the slide 16 of any one (or more) of the doors of the series is thrown so as to deadlock its bolt 9 all longitudinal movement of the bar or lever 18 is prevented, and as each bar 18 is connected to all the bolts 9 and 9ª of a single door it follows that all the bolts of said door will be deadlocked, and as it is also connected through the pivot 23 with its gang unlocking-lever 7 it follows that the latter will be restrained against longitudinal movement. Hence it becomes necessary to disconnect the gang unlocking-lever 7 of a deadlocked door from the gang-shaft, so as to permit the latter to turn to lock or unlock other doors not deadlocked, and this is accomplished by the lever 21, which, as before explained, is connected at its upper end to the lower end of lever 7 by the link 20 and at its lower end to the slide 16. As the latter is moved inwardly to deadlock its bolt 9 it turns lever 21 on its fulcrum 22, thus withdrawing the hook 19 of the lever 7 out of the path of the gang unlocking-cam 24. When the slide is moved to a position to release bolt 9, the lever 21 restores the hook 19 on lever 7 to its position in the path of movement of cam 24, so that the several bolts of the door will be actuated by the gang-shaft. Thus it will be seen that deadlocking any one door simply temporarily disconnects it from the gang, and the removal of the deadlocking-slide from engagement with main locking-bolt 9 restores its connection with the gang.

Each jamb 11 is provided with slots for the passage of the heads of the latch-bolts, and each slot is covered on its rear or inner face with a guard 26, which receives and conceals the heads of the several bolts.

The gang-shaft 25 is also provided with a locking-cam 27 for each door. These cams are secured on the shafts in a position to engage the rear edge of the rear hanger 2 of its respective door, so that when the doors are in a closed position and the gang unlocking-cams 24 are disengaged from the hooks 19 of the levers 7 these cams 27 rest across the path of movement of the rear hangers 2 of the doors and absolutely prevent any movement whatsoever of the doors. With this arrangement when the gang of doors is locked by the gang-shaft it is impossible to open any one of the doors; but with the locking mechanism described any one (or more) of the doors may be deadlocked, so that its locking-bolts will be unaffected by any movements of the gang-shaft.

The gang-shaft 25 extends throughout the length of the series of cells and may be actuated at either end or a point intermediate its ends by any suitable means. In Figs. 6, 7, 8, and 9 I have shown several forms of gang-shaft-operating devices. In the construction shown in Fig. 6 I have provided the shaft with a bevel-pinion 28, which meshes with a pinion 29 on vertical shaft 30. The lower end of this vertical shaft carries a bevel-pinion 31, which meshes with pinion 32 on short horizontal shaft 33, the latter being provided with a handle 34, by which the system of gearing is actuated. By pulling up on the lower end of lever 34 the shaft 25 is turned in a direction to unlock the doors and remove the cams 27 from the path of movement of the hangers, and a reverse movement turns the shaft to a position to lock all the doors. In Fig. 9 the short shaft 33 is turned in a direction to project through the end wall instead of parallel thereto, as in Fig. 6, and is provided with a crank 34ª. In Fig. 7 I have shown shafts 25 and 33 each provided with a sprocket-wheel carrying a chain 35 and shaft 33 provided with a hand-wheel 34ᵇ instead of a lever, and in Fig. 8 I have shown the shaft 25 provided with a pinion 36, engaged by a segmental rack 37 on the lever 38. The upper portion of the lever from its fulcrum up is inclosed, while the handle end is exposed. This is true also of all the other forms.

It is evident that many slight changes might be resorted to in the relative arrangement of parts shown and described without departing from the spirit and scope of my invention. Hence I would have it understood that I do not wish to confine myself to the exact construction herein shown and described; but, Having fully described my invention, what I claim as new, and desire to secure by Letters Patent, is—

1. The combination with a sliding door and bolt mechanism for same, of a shaft having bolt-unlocking device, means carried by the door and connecting the bolt mechanism of the latter with the unlocking device on the shaft, and a locking-cam on the shaft adapted, when the shaft is in one position to rest in the path of movement of the door and lock the latter against movement.

2. The combination with a sliding door mounted on hangers, of a shaft located within an inclosed frame or casing above the door, means carried by said shaft for actuating the bolt mechanism of the door, and means on said shaft and adapted when the shaft is in one position to rest in the path of movement of the door and lock the latter.

3. The combination with a sliding door mounted on hangers, of a rocking shaft located within an inclosed frame or casing above the door and provided with an arm or cam, which when the shaft is in one position rests in the path of one of the hangers within said frame or casing, and locks the door against movement.

4. The combination with a sliding door, a casing or frame above the door, a track within said casing or frame, and door-hangers mounted on the track and carrying the door, of a rocking shaft also located within said casing and provided with means for unlocking the bolts of the door and with an arm or cam for locking said door when the shaft is in one position.

5. The combination with a sliding door carrying a series of pivoted bolts, a jamb having a slot for each bolt and bolt-guards secured to the rear face of the jamb over the bolt-slots therein, of means carried by the door and connecting the several bolts, a gang-shaft located above the door and carrying an unlocking-cam and means whereby the bolt-connecting devices on the door may be engaged with and disengaged from the unlocking-cam on the shaft.

6. The combination with a shaft having an unlocking-cam and a locking-cam, and means for turning said shaft, of a sliding door, hangers supporting said door, the rear hanger adapted to be engaged by said locking-cam when the shaft is in one position, and bolt-actuating devices carried by the door and adapted to be engaged by the unlocking-cam, substantially as set forth.

In testimony whereof I have signed this specification in the presence of two subscribing witnesses.

ARTHUR J. HORGAN.

Witnesses:
JAMES V. REDDY,
THOS. F. KEATING.